3,574,169
ARYLENE SULFIMIDE POLYMERS
Gaetano F. D'Alelio, South Bend, Ind., assignor to the United States of America as represented by the Secretary of the Air Force
No Drawing. Continuation-in-part of application Ser. No. 668,254, Sept. 15, 1967. This application Dec. 3, 1969, Ser. No. 881,919
Int. Cl. C08g 20/00
U.S. Cl. 260—78                                                9 Claims

ABSTRACT OF THE DISCLOSURE

New polymers of improved resistance to high temperatures comprising polyarylene polysulfimides prepared by the condensation of tetrafunctional aromatic polysulfonic compounds of the formula

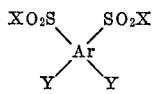

with polyamines of the formula $H_2N-Ar'-NH_2$ wherein Ar and Ar' represent polyvalent aromatic nuclei; the $SO_2X$ groups are each paired with a Y radical in an ortho or peri position; Y represents —COX or —$SO_2X$; X is OR, Cl, Br, or two X's of adjacent functional groups can together represent —O— or —NR—; and R is hydrogen or a hydrocarbon radical of no more than 20 carbon atoms. The polymers of this invention may be used for preparing laminates, adhesives, fibers and molding compositions particularly for use at high temperatures such as in aerospace flight.

CROSS-REFERENCES TO RELATED APPLICATIONS

This application is a continuation-in-part of U.S. Ser. No. 668,254, filed Sept. 15, 1967 (now abandoned). The following applications were filed on the same date as Ser. No. 668,254: U.S. Ser. No. 668,255 entitled "Arylene Sulfimide Polymers," U.S. Ser. No. 668,753 entitled "Tetrafunctional Aromatic Sulfonic Compounds," and U.S. Ser. No. 668,251 entitled "Arylene Sulfimide Polymers."

This invention relates to polymers comprising polymeric aromatic sulfimides. More specifically, it relates to polymers which can be classified as polysaccharins and polyarylenepolysulfonimides. Still more specifically, it relates to condensation polymers produced by the condensation reaction of aromatic polyamines with the monomeric tetrafunctional aromatic sulfonic compounds.

BACKGROUND OF THE INVENTION

There has always been a great interest in developing organic polymers of high heat resistance. Obviously, the decomposition, discoloration, charring, loss of weight, and even combustion resulting upon exposure of organic materials, including organic polymers to high temperatures, has been a drawback in the use of such materials. Therefore, in spite of the various advantages of using organic polymers, such as availability, ease in fabrication, weight and in many cases economics, there is a limitation on the use of organic polymers where high temperatures are likely to be encountered.

SUMMARY OF THE INVENTION

In accordance with the present invention, a new series of polymers has been found which are capable of withstanding extremely high temperatures, for example, temperatures in the range of about 500° C. to 1000° C., preferably in the range of about 500° C. to 600° C. These new polymers are condensation polymers of monomeric aromatic compounds having two or more amino radicals condensed with the monomeric tetrafunctional compounds which contain four functional groups comprising two pairs in which the two members of each pair are ortho or peri to each other and at least one member of each pair is a sulfonic radical and the other functional group of the pair is either a carboxylic or a sulfonic group.

These tetrafunctional monomers can be represented by the formula

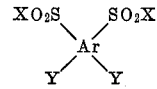     (Formula I)

wherein Ar represents a tetravalent carbocyclic aromatic nucleus, such as benzene, naphthalene, diphenyl, diphenyl oxide, diphenylsulfide, diphenylsulfone, diphenylsulfoxide, diphenylketone, diphenylamine, diphenylmethane, etc.; each of the $SO_2X$ groups is paired with a Y in ortho or peri position to it; Y represents —COX or another $SO_2X$; X is OR, Cl, Br, or 2 X's of adjacent functional groups can represent —O— or —NR—; and R is hydrogen or a hydrocarbon radical of no more than 20, preferably no more than 10 carbon atoms. Preferably, the Ar represents benzene, naphthalene, or diphenyl. Moreover, where "ortho" positioning is referred to herein, the "peri" positions, or 1, 8 and 4, 5 paired positions of napthalene are considered equivalent to ortho positioning for the purpose of this invention.

In the preparation of the tetrafunctional monomers, precautions must be taken to ensure that the Y groups are adjacent an —$SO_2X$ group. This can be accomplished by various means. For example, p-xylene can be disulfonated to give 2,5-xylene disulfonic acid. This compound can be oxidized to convert the methyl groups to carboxylic acid groups. Where it is desired to position two sulfonic groups ortho to each other, this can be effected by selecting appropriate starting materials so that the first two sulfonic acid groups will each be positioned ortho to a group which subsequently can be converted by any suitable means to a sulfonic acid group. Such positioning is illustrated hereinafter.

Tetrafunctional compounds according to the above formula in which Ar is benzene, naphthalene, diphenyl or derivatives of diphenyl can be prepared by the below-described procedures. An aromatic compound having one of the aforementioned radicals as its nucleus and having 1 to 3 methyl groups attached thereto is first sulfonated to give a sulfonic acid. The sulfonic acid is then oxidized to convert the methyl groups to carboxylic acid groups. For example, p-xylene can be disulfonated to give 2,5-p-xylene disulfonic acid which can then be oxidized to convert the methyl groups to carboxylic acid groups. As examples of other methods for preparation of tetrafunctional monomers, m-xylene is reacted with chlorosulfonic acid to give m-xylene-4,6-disulfonyl chloride which is then reacted with alcoholic ammonia to give m-xylene-4,6-disulfonamide. The latter compound is then oxidized by reaction in sulfuric acid with an oxidizing agent, such as sodium dichromate, to give m-bisaccharin, the dicyclimide of m-tetraacid. The m-bisaccharin can then be reacted with an alcohol, such as ethanol, to provide the diester of m-bisaccharin, for example, the diethyl ester of m-bisaccharin (diethyl-4,6-disulfamidophthalate). Alternatively, the m-bisaccharin can be reacted with hydrochloric acid and nitric acid to give m-tetraacid (benzene-1,3-dicarboxyl-4,6-disulfonic acid) which can be reacted with acetyl chloride to provide m-bianhydride, the dianhydride of m-tetraacid. Specific examples of suitable aromatic compounds used as starting materials include m-toluene, p-toluene, p-aminotoluene, 2,6-dimethylnapthalene, 1,5-dimethylnaphthalene, 4,4'-dimethyldiphenyl, 4,4'-dimethyl derivative of diphenyloxide, diphenylamine, diphenylsulfide diphenylsulfone, diphenylsulfoxide, diphenylketone and diphenylmethane.

Typical preparation of tetrafunctional monomers having carboxylic and sulfonic acid groups are illustrated by the following:

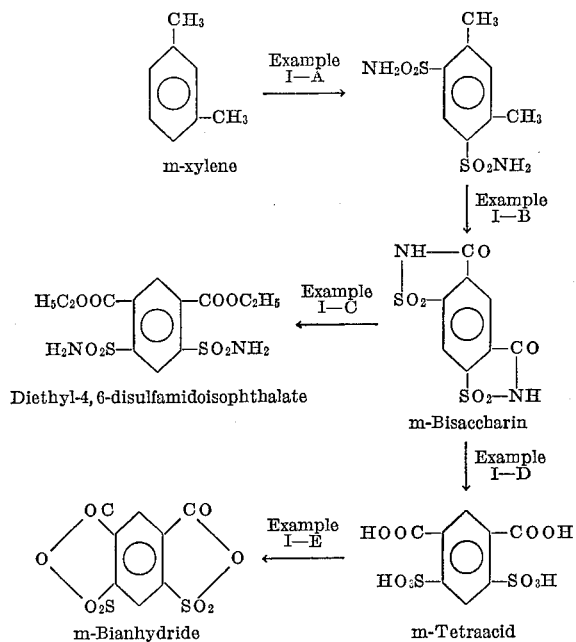

Diethyl-4,6-disulfamidoisophthalate m-Bisaccharin m-Bianhydride m-Tetraacid

The tetrafunctional compounds prepared as described above have both carboxylic and sulfonic acid groups. When it is desired to prepare a compound having four sulfonic acid groups, a starting material is utilized that also has one of the above-mentioned aromatic radicals as its nucleus. However, the aromatic radical is free of methyl groups and has two amino groups attached thereto. Examples of compounds useful as starting materials include benzidine, p-phenylenediamine, 2,5-diaminonaphthalene, and 4,4'-diamino derivatives of diphenyloxide, diphenylamine, diphenylsulfide, diphenylsulfone, diphenylsulfoxide, diphenylacetone and diphenylmethane. The aromatic compound having two amino groups is first sulfonated to give a compound having two amino groups and two sulfonic acid groups. This latter compound is then converted to a tetrazonium compound by reaction with sodium nitrite and hydrochloric acid. The tetrazonium compound is reacted with cuprous chloride to give a compound having two sulfonic acid groups and two chlorine atoms. This latter compound is reacted with a sulfur dioxide-acetic acid solution to give an aromatic compound having four sulfonic acid groups. For example, starting with benzidine, this compound is sulfonated, thereby obtaining 3,3'-benzidinedisulfonic acid which is then converted to the tetrazonium compound by reaction with sodium nitrite and hydrochloric acid. The tetrazonium compound is then reacted with cuprous chloride. The resulting product is reacted with a sulfur dioxide-acetic acid solution to give a desired product, namely, diphenyl-3,3',4,4'-tetrasulfonic acid.

A method of preparing a typical compound having four sulfonic acid groups is illustrated by the following:

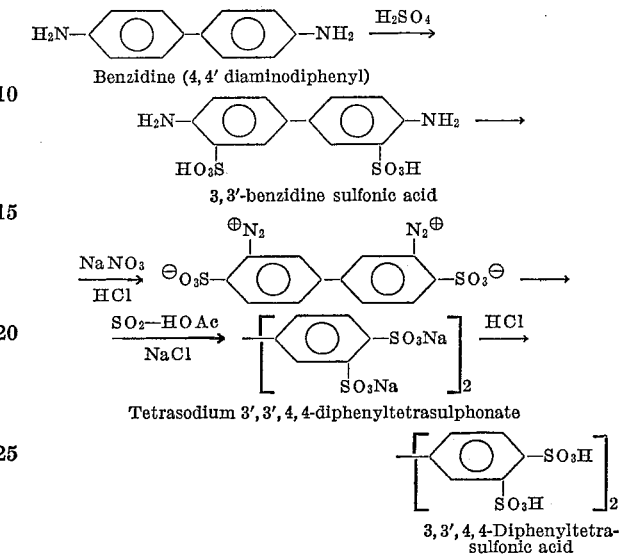

Benzidine (4,4' diaminodiphenyl)

3,3'-benzidine sulfonic acid

Tetrasodium 3',3',4,4-diphenyltetrasulphonate 3,3',4,4-Diphenyltetrasulfonic acid The reactions are generally carried out at temperatures ranging from about 5° C. to 120° C., utilizing stoichiometric amounts of the reactants. The polymers can be recovered by cooling, as by pouring on crushed ice, followed by filtration.

The polymers of this invention consist essentially of repeating units having one or more of the following structures sometimes generically referred to herein as Z:

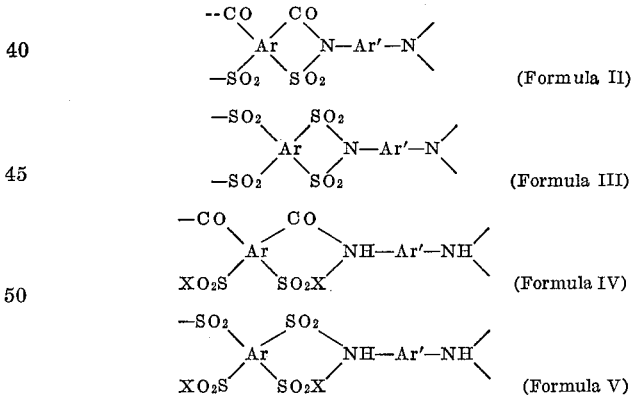

(Formula II)

(Formula III)

(Formula IV)

(Formula V)

Ar' is a divalent carbocyclic aromatic nucleus similar to Ar except for the difference in valency.

Condensation reactions by which polymers of this invention are produced can be represented as follows:

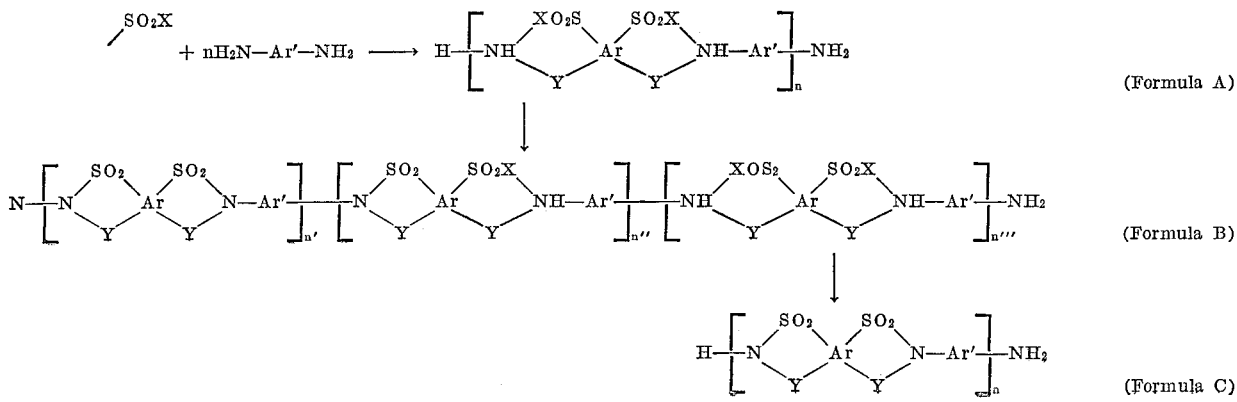

(Formula A)

(Formula B)

(Formula C)

Formula A represents the hemipolymers of the initial stages. Formula B represents the polymers in intermediate stages as ring closure is effected. The relative values or ratio of $n'$ to $n'''$ can vary over a wide range. The middle repeating unit structure of Formula B is generally omitted to simplify the overall structure which is generally represented as having two closed or open rings in the particular repeating unit. The structure of Formula C can be achieved but heating is generally stopped before complete cyclization is effected.

The invention of this application and that of the copending U.S. Ser. No. 668,251 are distinguished by the presence of thiazone radicals having the structure —C=N—. The presence of such radicals in the polymers described in these two applications is easily determined by characteristic infrared analysis. This determination clearly indicates whether such radicals are present. The polymers of the present invention are claimed herein as having the various repeating units defined herein and is substantially free of radicals of the thiazone structure. The copending Ser. No. 668,251 covers polymers which can have many of the repeating units described herein but also have the thiazone radical in the polymer structure.

The terminal groups on these polymers will depend on whether the condensation reagents are used in stoichiometric amounts or whether one is used in excess. When excess polyamine is used the terminal groups will be H, R or >N—Ar'—NHR. When excess polyfunctional monomer is used the terminal groups will be X at the left terminus of one of the repeating units as drawn and, at the right side of the repeating unit at the other end of the polymer, as drawn:

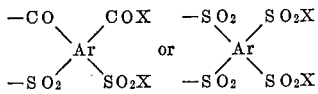

or

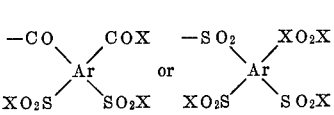

Generally the polymers are represented as prepared by the use of stoichiometric amounts of monomeric reagents. Therefore the various polymers can be represented by the following formulas with the understanding that the terminal groups can vary according to whether one reagent is used in excess. The various symbols have the meanings defined above and $n$ has a value of at least 2, and preferably at least 4.

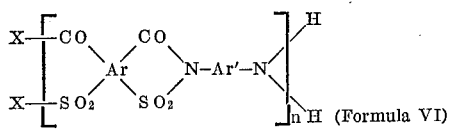

(Formula VI)

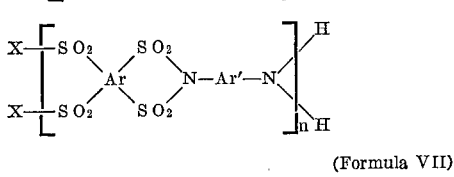

(Formula VII)

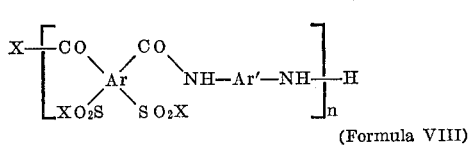

(Formula VIII)

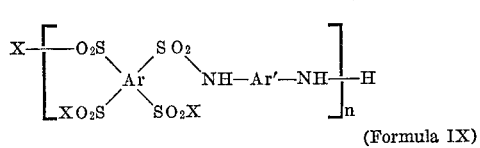

(Formula IX)

DESCRIPTION OF THE PREFERRED EMBODIMENTS

Typical tetrafunctional monomeric compounds prepared according to methods described hereinbefore and useful in preparing the polymers of this invention are illustrated by the compounds listed below. These tetrafunctional monomeric compounds are also disclosed and claimed in copending U.S. application Ser. No. 668,753.

(1) Benzene - 1,3 - dicarboxyl - 4,6 - disulfonic acid, sometimes hereinafter referred to as "m-tetraacid";

(2) The dianhydride of m-tetraacid, which is sometimes referred to herein as "m-bianhydride";

(3) The dicyclimide of m-tetraacid, which is sometimes referred to herein as "m-bisaccharin";

(4) The diesters of m-bisaccharin, such as the diethyl ester of m-bisaccharin, which is also known as diethyl-4,6-disulfamidoisophthalate;

(5) Naphthalene - 1,5 - dicarboxyl - 2,6 - disulfonic acid and the corresponding dianhydride, dicyclicimide and diesters;

(6) Naphthalene - 1,5 - dicarboxyl - 4,8 - disulfonic acid and the corresponding dianhydride, dicyclicimide and diesters;

(7) Naphthalene - 2,6 - dicarboxyl - 3,7 - disulfonic acid and its corresponding derivatives;

(8) Diphenyl - 4,4' - dicarboxyl - 3,3' - disulfonic acid and its corresponding dianhydride, dicyclicimide and diesters;

(9) Diphenyl - 3,3' - dicarboxyl - 4,4' - disulfonic acid and its corresponding derivatives;

(10) Diphenylmethane - 4,4' - dicarboxyl - 3,3' - disulfonic acid and its corresponding dianhydride, dicyclicimide and diesters;

(11) Diphenyloxide - 4,4' - dicarboxyl - 3,3' - disulfonic acid and its corresponding dianhydride, dicyclicimide and diesters;

(12) Diphenylsulfide - 3,3' - dicarboxyl - 4,4' - disulfonic acid and its corresponding derivatives;

(13) Diphenylsulfone - 4,4' - dicarboxyl - 3,3' - disulfonic acid and its corresponding dianhydride, dicyclicimide and diesters;

(14) Diphenylsulfoxide - 4,4' - dicarboxyl - 3,3' - disulfonic acid and its corresponding derivatives;

(15) Diphenylamine - 3,3' - dicarboxyl - 4,4' - disulfonic acid and its corresponding derivatives;

(16) Diphenylketone - 4,4' - dicarboxyl - 3,3' - disulfonic acid and its corresponding derivatives;

(17) Diphenylmethane - 3,3' - dicarboxyl - 4,4' - disulfonic acid and its corresponding derivatives;

(18) Benzene - 1 - carboxyl - 2,4,5 - trisulfonic acid and its dianhydride, dicyclicimide and diesters;

(19) Naphthalene - 1 - carboxyl - 2,5,6 - trisulfonic acid and its corresponding derivatives;

(20) Diphenyl - 4 - carboxyl - 3,3',4' - trisulfonic acid and its corresponding derivatives;

(21) Diphenylsulfide - 3 - carboxyl - 3,4,4' - trisulfonic acid and its corresponding derivatives;

(22) Diphenylsulfoxide - 4 - carboxyl - 3,3',4' - trisulfonic acid and its corresponding derivatives;

(23) Diphenylamine - 3 - carboxyl - 3',4,4' - trisulfonic acid and its corresponding derivatives;

(24) Benzene - 1,2,4,5 - tetrasulfonic acid, its dianhydride, dicyclicimide and diesters;

(25) Naphthalene - 1,2,5,6 - tetrasulfonic acid, its dianhydride, dicyclicimide and diesters;

(26) Naphthalene - 1,4,5,8 - tetrasulfonic acid, its dianhydride, dicyclicimide and diesters;

(27) Diphenyl - 3,3',4,4' - tetrasulfonic acid and its corresponding derivatives;

(28) Diphenyloxide - 3,3',4,4' - tetrasulfonic acid and its corresponding derivatives;

(29) Diphenylsulfone - 3,3',4,4' - tetrasulfonic acid and its corresponding derivatives;

(30) Diphenylmethane - 3,3',4,4' - tetrasulfonic acid and its corresponding derivatives;

(31) Diphenylketone - 3,3',4,4' - tetrasulfonic acid and its corresponding derivatives.

These and other tetrafunctional compounds can be prepared by various methods, but preferred methods are illustrated in the working examples identified hereinafter as Example I (A)–(P).

Formulas of some of these preferred tetrafunctional monomeric compounds are represented by the following structural formulas:

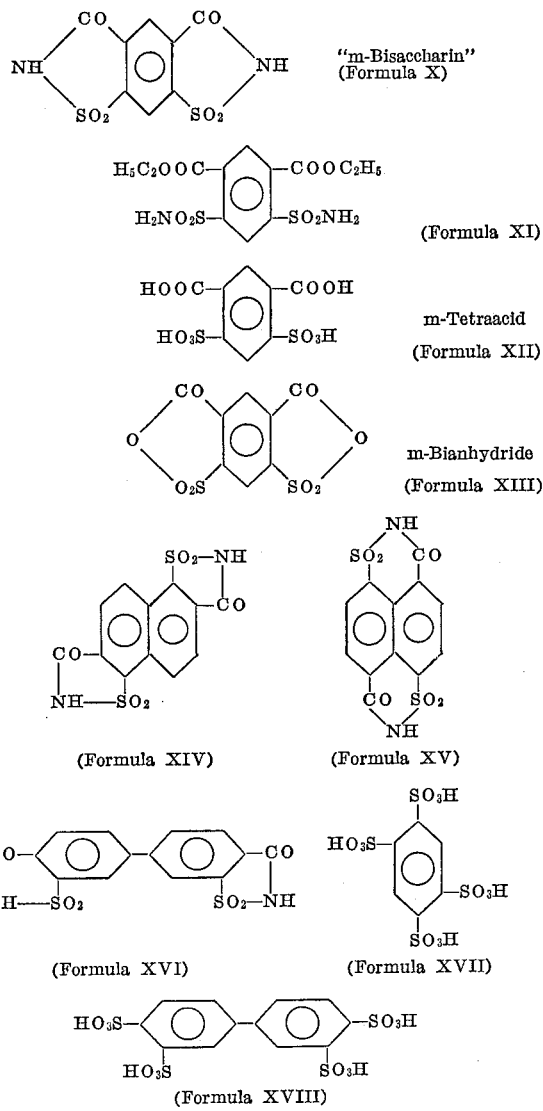

In the polymerizations of this invention the tetrafunctional monomers described above are condensed with polyfunctional aromatic amines of the formula $$NH_2—Ar'—NH_2$$

The Ar' is a polyvalent carbocyclic aromatic, sometimes a divalent radical, as described above for Ar, and other groups can be on the aromatic nucleus as described for Ar. There can also be one or two additional NH₂ groups so as to include aromatic triamines and tetraamines. Preferably the Ar' is a benzene, naphthalene or diphenyl radical having only NH₂ groups attached.

Where reference is made to bisaccharin condensations with such polyamines it is intended to include similar condensations using corresponding tetraacids, dianhydrides, esters, amides, etc.

Postheating of the bisaccharin condensation products of aromatic polyamines gives pseudosaccharins or "thiazones" which are further described and claimed in the above-mentioned Ser. No. 668,251. Pseudosaccharin polymers are derived where the oxygen of the carboxy group is eliminated to give a >C—N— type of structure.

The polymerization reactions of the bisaccharins proceeds best by "transamidation," e.g. when performed in the presence of an amine, such as in a triethylamine-water system. The bisaccharin reaction mixtures when heated at 200–220° C. for several hours give hemi-polymers which are soluble in dimethylacetamide. The respective infrared spectra show that the hemi-polymers exist mainly in the form of

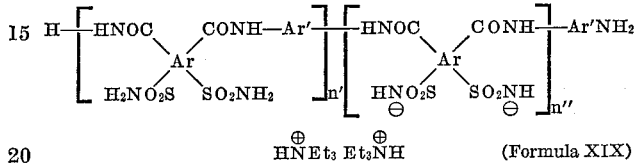

wherein n' is greater than n''.

If the triethylamine is removed the hemipolymer has the formula:

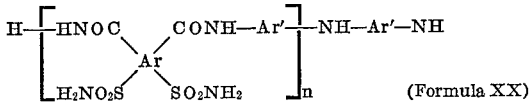

As ring closure of the saccharin type is effected the polymer acquires the structure:

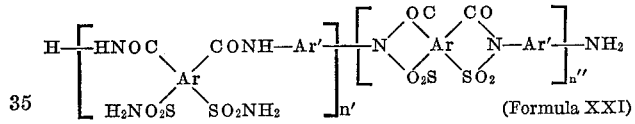

As the value of the n'' to n' ratio increases the polymer becomes more insoluble.

Hemipolymers derived from tetrasulfonic monomers have the formula:

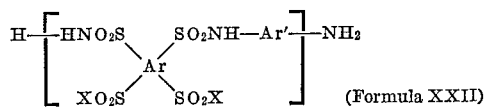

As ring closure is effected the polymer acquires the structure:

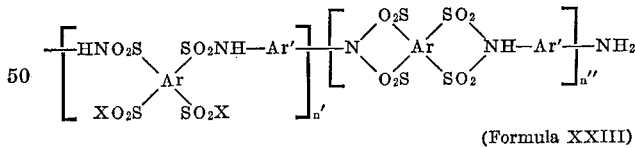

In preparing the polysaccharine type of polymer, the sulfonic and the carboxylic groups of the starting monomer can be in the acid form or in a derivative form such as ester, amide, anhydride, imide, acid halide or other form which is easily condensable with the amino groups attached directly to the Ar' aromatic nucleus and the ester, amide, etc. groups are displaced during the condensation reaction.

The polydisulfonimide types of polymers are prepared by using similar monomeric materials having a sulfonic acid group replacing the carboxylic group in the saccharine type of monomer. In this case also, the various derivative groups indicated above can be present in the starting compound provided they do not interfere with the condensation in either the preliminary hemipolymer formation or in completing the cyclic structure of the polymer.

Upon initial condensation, only one of the functional groups condenses with the amine group so as to form hemipolymers which have the repeating unit structure such as shown above in Formulas XIX, XX, and XXII. Upon further heating, the condensation with the second functional group is effected so as to produce the cyclic structure in the repeating units shown in Formulas XXI and XXIII.

When a saccharine type monomer is used, the initial condensation of the amino groups is with the carboxy group and the ultimate cyclization in the repeating structure is completed through the sulfonic group.

The Ar and Ar' radicals are preferably a benzene nucleus but they can have a napthalene, diphenyl, diphenyloxide, diphenylamine, diphenylsulfide, diphenylketone, diphenylsulfone, diphenylsulfoxide, diphenylmethane, etc. nuclear structure and can have various substituent groups therein such as various hydrocarbon radicals, such as suitable for R, namely alkyl, alkenyl, aryl, alkaryl, aralkyl, cycloalkyl, cycloalkenyl, including as typical examples methyl, ethyl, propyl, butyl, hexyl, decyl, phenyl, tolyl, naphthyl, methylnaphthyl, ethylnaphthyl, diphenyl, xylyl, cyclohexyl, cyclopentyl, cyclohexenyl, methylcyclohexyl, methylcyclohexenyl, vinyl, allyl, hexeny,1 octenyl, ethylphenyl, vinylphenyl, allylphenyl, etc.; and also chlorophenyl, bromophenyl, fluorophenyl, iodophenyl, trifluoromethyl, etc.; and also halogen atoms, such as chloro, bromo, iodo, fluoro, cyano, etc. Advantageously there are no more than 20 carbon atoms in such groups, preferably no more than about ten, particularly in the R group.

Numerous other types of radicals can be present, as previously indicated, provided they do not interfere with the condensation reaction or produce undesirable properties in the resultant polymer. Obviously, the undesirable properties will be determined in accordance with the ultimate use of the polymer. For example, if a derivative group is not capable per se of withstanding high temperatures, the presence of such a group in a polymer ultimately to be used for heat resistance purposes will not be satisfactory. However, for certain other uses where this particular group imparts a desirable property and the ultimate polymer is not to be used where heat resistance is required, then even such groups can be present. It is intended that the scope of the invention include polymers having such a variety of derivative groups. However, for most purposes, the simpler types of structures specifically disclosed herein are preferred. Moreover, while many groups included within the definition, such as acetylenic, spiro, cyclopentadientyl, butadienyl, etc., may not be preferred, they are operable and are included in the broad scope of the invention.

In addition to melt polymerization, the polymerizations of this invention can be conducted in an activating medium, such as a triethylamine-water system, dimethylformamide, dimethylsulfoxide, butyrolactone, polyphosphoric acid and dimethylacetamide. The temperature and the time of heating can be varied according to the type of polymer and the degree of polymerization desired. The hemipolymers are generally soluble in dimethylacetamide, but the solubility decreases as the heating is continued and more of the repeating units are thereby converted to the cyclic structure. Final ring closures in the polymers occur in the range of 400–500° C.

Generally the polymers are not completely of the closed ring type and there is usually at least a small amount of the open type structure, as shown above. Generally, as the polymerization progresses, the ratio of $n''$ to $n'$ keeps increasing until there are very few repeating units of the open structure so that $n'$ becomes relatively small.

Moreover, in formulas where two types of repeating units are indicated and subscripts $n'$ and $n''$ are used to indicate the number of such units, it is not intended that these formulas represent block copolymers. Instead, the two types of repeating units are distributed at random along the polymer chain and the similar repeating units are grouped within the brackets merely to indicate the number of such repeating units.

The polymerizations of the saccharine type of monomers are best conducted in the presence of a tertiary amine, such as triethylamine, tripropylamine, triphenylamine, tricyclohexylamine, etc. Such tertiary amines apparently catalyze the transamidation or replacement of the nitrogen originally attached to the carboxy group of the saccharine heterocyclic ring with the nitrogen of the amino group attached to the aromatic nucleus. The heterocyclic ring is thereby opened with the original nitrogen remaining attached to the sulfur until the ring is subsequently reclosed and the nitrogen attached to the sulfur being thereby completely eliminated.

The polymerizations can be conducted in any suitable equipment adapted to produce the conditions required. In most cases in the examples described hereinafter, the polymerization vessel is merely a glass tube or glass flask in which the required atmospheric conditions and the desired temperatures are maintained.

For determination of the thermal properties of the polymers, a 950 Thermogravimetric Analyzer marketed by Du Pont is used in conjunction with a 900 Differential Analyzer. A heating rate of 15° per minute is used and a number of thermogravimetric measurements are made in nitrogen and in air at a flow rate of 0.5 standard liter per minute.

As previously indicated, the time of condensations can be varied in accordance with the type of product desired. The longer the heating period, the higher the degree of polymerization and the resultant molecular weight and ring closure. The effect of these factors is illustrated in the examples below.

As previously indicated the polymer products of this invention are useful for many purposes particularly where heat resistance is desired. They may be used in preparing laminates, adhesives, fibers, molding compositions, etc. Upon curing, these compositions become completely insoluble in common and extraordinary solvents. The hemipolymers or low molecular weight polymers can be dissolved or softened by solvents for various spinning, or shaping operations and cured after fabrication. When cured at 350° C. or higher any substrate material used with the polymer must be likewise capable of withstanding high temperature. Fibers made from these materials can be made into heat-resistant fabrics suitable for aerospace purposes, such as parachutes, speed-breaking parachutes, etc. where heat is likely to be generated.

Various methods of practicing the invention are illustrated by the following examples. These examples are intended merely to illustrate the invention and not in any sense to limit the manner in which the invention can be practiced. The parts and percentages recited therein and all through the specification, unless specifically provided otherwise, are by weight.

EXAMPLE I

A series of tetrafunctional monomers is prepared for use in the preparation of the polymers of this invention.

(A) Synthesis of m-xylene-4,6-disulfonamide m-Xylene (50 g., 1.47 mole) is added slowly with stirring to 400 ml. of chlorosulfonic acid in a 2-liter, three-neck, round bottom flask, equipped with a mechanical stirrer, a condenser, a thermometer and connected to a mineral oil trap as a gas outlet. The temperature of the mixture rises to about 60° C. in the course of the addition of the m-xylene. Then the temperature is raised slowly to 110° C. and maintained at that temperature for thirty minutes. The mixture is then cooled to about 25° C. and poured onto crushed ice. An oil separates which solidifies on standing. The solid is removed by filtration, dried in a vacuum oven overnight and then recrystallized from ether and dried in a vacuum oven at room temperature. The yield of m-xylene-4,6-disulfonyl chloride is 97% of theoretical and this has a melting point of 120–122° C. (The literature reports a melting point of 129° C.)

Then 140.0 g. of m-xylene-4,6-disulfonyl chloride is dissolved in one liter of benzene and 600 ml. of 5 N alcoholic ammonia solution is added with stirring. The addition of the ammonia solution is such as to assure that the solution is basic at all times. A white solid separates which is removed by filtration, and it is washed thoroughly with water to free it from ammonium chloride. The crude sulfonamide is then purified by recrystallization from 10% ethanol solution. About 10.0 g. of a residue, insoluble in 10% ethanol, and melting at 275–280° C. is obtained as a byproduct and is discarded. This is probably a sulfone formed as a byproduct of the reaction. The pure sulfonamide is obtained as needle-shaped white crystals.

The yield of m-xylene-4,6-disulfonamide is 76% of the theory and the melting point is found to be 255–258° C. (The literature reports 249° C. The infrared spectrum shows the absorption characteristics of the $SO_2NH_2$ groups at $7.6\mu$.

(B) Oxidation of m-xylene-4,6-disulfonamide to m-bisaccharin

Sodium dichromate (22.5 g.) is added to a cold mixture of 21.0 g. of water and 57.6 g. of sulfuric acid (Sp. Gr. 1.84) in a two-liter, three-neck, round-bottom flask equipped with a mechanical stirrer and a condenser. After mixing the ingredients, the flask is placed in a thermostatically-controlled bath maintained at 54° C. and the contents are stirred for two to three minutes. m-Xylene-4,6-disulfonamide (11.0 g., 0.0415 mole) is added to the mixture in the flask very slowly while the mixture is stirred vigorously. Then, after one or two minutes, 102.0 g. of sulfuric acid (Sp. Gr. 1.84) is added slowly to the mixture from a dropping funnel. The reaction starts immediately and proceeds smoothly. Stirring is continued for thirty minutes and the brown-red color of the solution turns green. Then the mixture is poured onto crushed ice. A white product precipitates and is separated by filtration. The residue obtained is dissolved in aqueous sodium carbonate solution and is precipitated by adding sulfuric acid. This is repeated once more to purify the product. The "m-bisaccharin" obtained is dried and weighed. The yield of the product is 84% of theoretical and the melting point is found to be 405–410° C. (with decomposition) by differential thermal analysis. The "m-bisaccharin" is soluble in water and in aqueous sodium carbonate solution.

Analysis.—Calc'd for $C_8H_4O_6S_2N_2$ (percent): C, 33.30; N, 9.70; H, 1.40; S, 22.20. Found (percent): C, 32.59; N, 9.81; H, 1.40; S, 22.12.

The infrared spectrum shows the absorption characteristics of N—H at $3.4\mu$, $SO_2$-N at $8.44\mu$ and carbonyl groups at $6.9\mu$. "m-Bisaccharin," (0.2557 g.) is dissolved in water and titrated with 0.0838 N sodium hydroxide solution using a Beckman pH meter. From the plot of sodium hydroxide (ml.) versus pH the endpoint is obtained. On the basis of the titration results "m-bisaccharin" is found to have a neutralization equivalent equal to 1.98 (calculated equivalent 2.0).

(C) Synthesis of diethyl-4,6-disulfamidoisophthalate

A 5.0 g. portion of "m-bisaccharin" suspended in 130 ml. of absolute ethanol is saturated with hydrochloric acid gas at about 5° C. The solution is filtered and the filtrate is evaporated to dryness under reduced pressure. The ethyl ester is thus recovered and is purified by washing first with water to remove any m-bisaccharin present and then with absolute ethanol. Some unreacted "m-bisaccharin" insoluble in ethanol, is also recovered as a residue. The ester is soluble in ethanol and insoluble in water. The melting point of the ester is found to be 230–232° C. and the yield is 62% of theoretical. A purified and dried sample is analyzed.

Analysis.—Calc'd for $C_{12}H_{16}O_8S_2N_2$ (percent): C, 37.90; N, 7.36; S, 16.83; H, 4.21. Found (percent): C, 37.27; N, 7.90; S, 17.23; H, 4.08.

The infrared spectrum shows the characteristic absorptions for $SO_2NH_2$ at $7.5\mu$ and $8.64\mu$, and also for ester carbonyls at $5.94\mu$.

(D) Synthesis of m-tetraacid from m-bisaccharin modified acid hydrolysis of m-bisaccharin "m-Bisaccharin" (6.05 g., 0.021 mole) is mixed with 52.5 ml. of 12 N hydrochloric acid in a three-neck, round-bottom flask equipped with a mechanical stirrer, a condenser and a thermometer. The mixture is heated to 60–65° C. and maintained at that temperature for thirty minutes. Foaming and evolution of gases occurs. Then, from a dropping funnel, 5.6 ml. of nitric acid (90%) is added slowly to the mixture. After all the nitric acid has been added the mixture is heated to 90–95° C. and maintained at that temperature for four hours. After three hours of heating, the solution becomes clear. The heating is continued for another hour to insure complete reaction. Then the solution is filtered to remove impurities and unreacted bisaccharin. The clear filtrate is evaporated at reduced pressure until it appears completely free from fumes and the residue dried in a vacuum oven for fifteen hours. On cooling the resultant viscous mass becomes a white solid. The yield of crude material is 97% of theoretical (on the basis of tetrahydrate). The crude "m-tetraacid" is kept over phosphorus pentoxide in a vacuum desiccator for fifteen days to remove any free moisture present. The melting point of the dried tetraacid is found to be 110–112° C.

Analysis.—Calc'd for $C_8H_6O_{10}S_2 \cdot 4H_2O$ (percent): C, 24.15; H, 3,52; S, 16.10. Found (percent): C, 24.47; H, 3,53; S, 16.31.

"m-Tetraacid," 0.100 g. (previously dried over phosphorus pentoxide) is titrated with standard sodium hydroxide solution using a Beckman pH meter. The tetraacid is found to have a neutralization equivalent of 4.08 on the basis of the tetrahydrate (calculated equivalent 4.0).

Thermogravimetric analysis on a portion of the solid tetraacid is also carried out at a heating rate of 2° C. per minute, which indicates the loss of about four water molecules per molecule of tetraacid up to 125° C.

The infrared spectrum of the "tetraacid" is recorded as a KBr disc, shows distinct absorptions for COOH at $6.1\mu$ and also for $SO_3H$ at $8.1\mu$ and $9.4\mu$.

(E) Synthesis of m-bianhydride from m-tetraacid

Five g. (0.0152 mole) of the "m-tetraacid" is treated with 25 ml. (26.5 g., 0.34 mole) of acetyl chloride and refluxed for five hours in a round-bottom flask equipped with a reflux condenser and a calcium chloride drying tube. The tetraacid is found to react with acetyl chloride and foaming is observed initially. After the reaction is over, the solids are removed by filtration and recrystallized from dried benzene (dried over sodium) avoiding exposure to atmosphere as far as possible (m-bianhydried absorbs moisture very quickly and is converted to tetraacid). Beautiful needle-shaped white crystals, melting at 265–267° C., are obtained. The filtrate is distilled under vacuum and a dark-brown semisolid material is obtained. The dark-brown semisolid material is recrystallized in the same way and a small additional portion of m-bianhydride is recovered from it. The yield of m-bianhydride is 80% of the theory. The "m-bianhydride" prepared is preserved in a desiccator under vacuum over phosphorus pentoxide. It has been observed that the m-bianhydride is unstable to moisture. When exposed to air it absorbs moisture and is converted to the acid form. Special precaution has to be taken to avoid exposure to air in the preparation of an analytical sample of m-binanhydride. An analytical sample of bianhydride is prepared in the following way.

A portion of m-bianhydride prepared as described above is treated with an excess of fresh acetyl chloride and refluxed for five to six hours in round-bottom flask equipped with a calcium chloride drying tube. The solids are removed by filtration and placed immediately in an Abderhalden drying pistol. After drying for five to six hours under vacuum, a portion of the solid is immediately sealed in an ampoule under high vacuum to await analysis. Another portion is immediately titrated with standard sodium hydroxide solution using a Beckman pH meter. The infrared spectrum is also immediately recorded.

Analysis.—Calc'd for $C_8H_2S_2O_8$ (percent): C, 33.05; H, 0.63; S, 22.01. Found (percent): C, 33.16; H, 0.95; S, 21.64.

From the titration result m-bianhydride is found to have a neutralization equivalent equal to 3.96 (calculated equivalent 4.0). The infrared spectrum shows distinct doublet at about $5.5\mu$ characteristic of the anhydride carbonyl group and absorption for the carboxyl carbonyl group at about $6.0\mu$ is negative.

(F) Preparation of naphthalenedisaccharin compound

The procedures of Examples I(A)–(E) are repeated using in place of the m-xylene, an equivalent amount of 2,6-dimethylnaphthalene to give the corresponding naphthalenedisaccharin compound and the corresponding tetraacid, bianhydride and diethylsulfamidonaphthalenedicarboxylate are also prepared.

(G) Preparation of bisaccharin compound from 1,5-dimethylnaphthalene

The procedures of Examples I(A)–(E) are repeated using in place of the m-xylene an equivalent amount of 1,5-dimethylnaphthalene to give the bisaccharin compound and the corresponding derivatives thereof.

(H) Preparation of bisaccharin compound from 4,4'-dimethyldiphenyl

The procedures of Examples I(A)–(E) are repeated using in place of the m-xylene an equivalent amount of 4,4'-dimethyldiphenyl in place of the m-xylene to give the bisaccharin compound and the corresponding derivatives.

(I) Preparation of bisaccharin compounds from 4,4'-dimethyl derivatives of diphenyl compound The procedure of Example I(H) is repeated a number of times using in place of the diphenyl compound as a starting material, an equivalent amount respectively of a corresponding 4,4'-dimethyl derivative of diphenyloxide, diphenylamine, diphenylsulfide, diphenylsulfone, diphenylsulfoxide, diphenylketone and the diphenylmethane. In each case derivatives are obtained corresponding to those obtained in Example I(H) except that the basic diphenyl structure is replaced by the nuclear structure in the starting material.

(J) Preparation of 3,3'-benzidine disulfonic acid

In a 100-ml. three-neck, round-bottom flask, there are placed 4 ml. of water and 1.2 ml. (0.2 mole) of concentrated sulfuric acid. The solution is heated to 60° C. and to this, 18.4 g. (0.1 mole) of benzidine (4,4'-diaminodiphenyl) is added in portions with stirring. The mixture becomes a pink-colored slurry. An additional 6 ml. of water is added to the slurry and the temperature of the slurry is raised to 120° C. After heating at 120° C. for one hour, most of the water distills off. The reaction mixture is cooled to 100° C. and then heated to 180° C. for three hours under 12 mm. Hg pressure. The resulting black mass is heated to 230° C. and this temperature is maintained for three hours.

The black residue (35 g.) is ground and dissolved in 200 ml. of 3 N ammonium hydroxide and an insoluble black material is removed by filtration. The brown filtrate is acidified with 200 ml. of 6 N hydrochloric acid and the grey solid which is separated weighs 30.0 g. (80% yield).

A small sample of the grey solid is titrated with a standard sodium hydroxide solution. The neutralization equivalent of the solid is found to be 2.04 for a dihydrate form (calculated equivalent 2.0). The grey solid is purified by redissolving in 3 N ammonium hydroxide and then acidified with concentrated hydrochloric acid. There is obtained 25.0 g. of a greyish-white solid. Its neutralization equivalent is found to be 1.96 (calculated equivalent 2.0). Its infrared spectrum shows bands characteristic for $SO_3H$ at 1240 cm.$^{-1}$ and 1100 cm.$^{-1}$. Thermogravimetric analysis shows no weight loss up to 140° C., indicating that the disulfonic acid is in the anhydrous form. Differential thermal analysis shows an endotherm at 325° C.

(K) Preparation of diphenyl-3,3',4,4'-tetrasulfonic acid from 3,3'-benzidinesulfonic acid 3,3'-benzidinedisulfonic acid (10.0 g., 0.029 mole) is dissolved in a solution of 4.0 g. of sodium hydroxide in 50 ml. of water to give a brown solution. To the cooled brown solution is added a saturated sodium nitrite solution (4.7 g. in 14 ml. of water). It is allowed to stand in ice-water bath for fifteen minutes and the mixture is poured onto a mixture of 30 ml. of concentrated hydrochloric acid and 50.0 g. of ice with occasional shaking. Care is taken to keep the temperature of the acidic solution below 5° C. during the addition of the reaction mixture. The acidic solution is cooled in an ice-water bath for one-half hour and the insoluble material is removed by filtration. There is obtained 10.0 g. (94% yield) of the bright orange-brown tetrazonium compound.

The orange-brown solid is dissolved in 100 ml. of concentrated hydrochloric acid. The resulting brown solution is slowly added over a period of thirty minutes with occasional shaking, to a suspension of 1.5 g. cuprous chloride in 130 ml. of a fresh solution of 20% sulfur dioxide-acetic acid solution. Vigorous foaming occurs immediately, indicating the liberation of nitrogen. The reaction mixture is then allowed to stand at room temperature for several hours and evaporated to dryness. The titration of a portion of the resulting brown residue with standard sodium hydroxide solution shows that the brown residue has an neutralization equivalent of 3.88 for an anhydrous form (calculated value 4.0).

(L) Preparation of benzene tetrasulfonic acid

The procedure of Examples I(J) and (K) is repeated using in place of benzidine an equivalent amount of p-phenylenediamine. The corresponding benzene tetrasulfonic acid and its derivatives are obtained.

(M) Preparation of tetrasulfonic acids using 4,4'-diamine derivatives of diphenyl compounds The procedure of Examples I(J) and (K) is repeated a number of times using in place of the benzidine an equivalent amount respectively of the corresponding 4,4'-diamine derivatives of diphenyloxide, diphenylamine, diphenylsulfide, diphenylsulfone, diphenylsulfoxide, diphenylketone and diphenylmethane. In each case derivatives are obtained corresponding to those obtained in Example I(J) except that the basic diphenyl structure is replaced by the nuclear structure in the starting material.

(N) Preparation of tetrasulfonic acid from 2,5-diaminonaphthalene

The procedure of Examples I(J) and (K) is repeated using in place of the benzidine an equivalent amount of 2,5-diaminonaphthalene. The resultant product is a mixture of the 1,2,5,6- and 1,4,5,8-tetrasulfonic acid derivatives of naphthalene both of which are compounds of this invention.

(O) Preparation of tetrasulfonic acid from p-aminotoluene

The procedure of Examples I(J) and (K) is repeated using in place of the benzidine an equivalent amount of p-aminotoluene. The resultant toluene trisulfonic acid is oxidized according to the procedure of Example I(B) to give benzene-1-carboxyl-2,4,5-trisulfonic acid. Repetition of this procedure using corresponding appropriate aminemethyl derivatives of naphthalene, diphenyl, diphenyloxide, etc. give the corresponding monocarboxylic trisulfonic acid compounds of this invention.

(P) Preparation of peri derivatives of naphthalene 1,4,5,8-tetramethylnaphthalene is oxidized according to the oxidation procedure of Example I(B) and the resultant tetracarboxylic acid is converted to the dicyclimide by standard procedure for converting p-dicarboxylic acids to the corresponding cyclimides. The dicyclicimide is then converted to the corresponding diaminodicarboxylic acid by the Hofman reaction which gives a mixture of the 1,4-dicarboxylic-5,8-diamino and the 1,5-dicarboxylic-4,8-diamino naphthalene isomers. Then the procedure of Examples I(J) and (K) is used to convert these isomers to naphthalene - 1,4 - dicarboxyl-5,8-disulfonic acid and naphthalene-1,5-dicarboxyl-4,8-disulfonic acid. These peri derivatives are converted to the corresponding dicyclicimides of the bisaccharin type by conversion to the amides with subsequent ring closure according to standard procedures for producing saccharin type ring closure. The corresponding dianhydrides and diesters are also prepared according to the procedures described above.

EXAMPLE II(a)

Polymerization of m-bisaccharin with p-phenylenediamine in triethylamine

A mixture of m-bisaccharin (1.88 g., 0.00635 mole), p-phenylenediamine (0.683 g., 0.00635 mole), triethylamine (0.978 g., 0.0097 mole) and water (3.30 g., 0.183 mole) are placed in a polymerization tube. The effluent gas is passed through a trap containing 150 ml. of 0.0943 N sulfuric acid. The mixture is refluxed at 100° C. for two and one-half hours under a slow nitrogen stream yielding an orange-brown solution. The solution is heated at 150° C. for two and one-half hours during which period the water is distilled from the reaction mass. Then the resulting orange-brown resinous material is heated at 170° C. for two and one-half hours, and then at 190° C. for fourteen hours. On cooling, there is obtained a shiny brown polymer which melts partly in the region of 220–230° C., but does not melt completely even at 300° C. It is insoluble in water, but soluble in dimethylacetamide. Its intrinsic viscosity at this stage is found to be 0.88 dl./g. in dimethylacetamide at 20° C.

The brown polymer is then heated at 230° C. for two hours and there is obtained 2.66 g. (106%) of a shiny, dark-brown solid having an intrinsic viscosity of 0.181 dl./g. in dimethylacetamide at 20° C. The dark-brown polymer does not melt when heated to 300° C. Its infrared spectrum shows an intense amide carbonyl absorption at 1620 cm.$^{-1}$, an intense $SO_2N$ absorption at 1160 cm.$^{-1}$ and a broad C—N absorption at 1270 cm.$^{-1}$.

From the titration of the excess acid in the trap with standard sodium hydroxides (0.1198 N), it is found that 35% (0.0034 mole) of triethylamine still remains bound in the polymer. The structure of the brown-black polymer at this stage is:

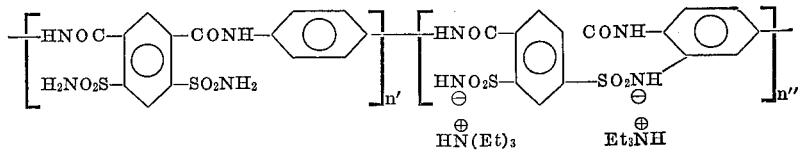

where $n' > n''$.

The differential thermal analysis of the dimethylacetamide-soluble polymer shows a sharp endotherm at 585° C. and several broad endotherms around 400–550° C.

EXAMPLE II(B)

1:1.6 mole ratio of m-bisaccharin to triethylamine m-Bisaccharin (1.44 g., 0.005 mole), p-phenylenediamine (0.542 g., 0.005 mole), triethylamine (0.808 g., 0.008 mole) and water (2.30 g., 0.13 mole) are placed in a polymerization tube. The tube is heated at 150° C. for two hours under a nitrogen stream. The effluent gas is passed through a trap containing 100 ml. of 0.0943 N sulfuric acid. During heating the water distills slowly from the clear, orange-brown solution; then the contents are heated at 200° C. for one hour and finally at 230° C. for eighteen hours. During the latter heating period, some foaming is noted. From titration of the excess acid in the trap with standard sodium hydroxide (0.1030 N), it is found that 25.5% (0.002 mole) of triethylamine still remains in the polymer mass. The trap is replaced with one containing 25 ml. of 0.0943 N sulfuric acid and the heating is continued for an additional seven hours. The contents of the trap are titrated with standard sodium hydroxide (0.1030 N). There remains in the polymer mass 0.0016 mole (21%) of triethylamine. There is obtained 1.97 g. (99.5%) of a glassy, brown-black solid. This polymer is found to have an intrinsic viscosity 0.171 dl./g. in dimethylacetamide at 20° C. The plot of $\eta$ sp./c. versus c gives a straight line with a negative slope. The polymer is insoluble in water, but slightly soluble in dimethylacetamide. The infrared spectrum of the polymer as a KBr disc is identical to that of Example II(a).

EXAMPLE II(C)

In polyphosphoric acid

A mixture of m-bisaccharin (2.88 g., 0.001 mole), p-phenylenediamine (1.09 g., 0.001 mole) and polyphosphoric acid (120 g.) is placed in a 250 ml. three-neck, round-bottom flask, equipped with heater, thermometer and stirrer, and adapted for removal of samples. The mixture is heated from room temperature to 160° C. within an hour; then this temperature is maintained for a period of ten hours. The color of the mixture turns gradually from white to grey and to dark grey. The dark grey mixture is then heated, with stirring, at 175–180° C. for fifty-five hours. The dark grey mixture becomes green in color and finally develops the appearance of a dark bluish-green paste. Samples are withdrawn at the end of six-hour, thirteen-hour, twenty-hour, twenty-seven-hour, thirty-two hour, forty-four-hour and fifty-five-hour periods. Each sample is mixed with cold methanol and the methanol-insoluble grey material which precipitates is separated by filtration, washed with methanol and dried. In every case, the grey polymer is insoluble in water, slightly soluble in dimethylacetamide, but very soluble in concentrated sulfuric acid. The change in intrinsic viscosity as a function of reaction time is as follows:

| Temperature, ° C. | Time in hours | [$\eta$] dl/gram in concentrated $H_2SO_4$ |
|---|---|---|
| 180 | 20 | 0.115 |
| 180 | 32 | 0.135 |
| 180 | 55 | 0.155 |

The remaining portion of the reaction mixture is heated at 185–190° C. for eighteen hours. At the end of eighteen hours of heating, some granulation in the solution is noted. Samples are withdrawn at seven hours (a), fourteen hours (b), and eighteen hours (c). After isolation of the polymer by procedures similar to those given above, samples (a) and (b) are in the form of a dark-green fluffy product which are slightly soluble in concentrated sulfuric acid. From sample (c) there is obtained a greenish-black solid which is no longer soluble in concentrated sulfuric acid. The infrared spectrum of the greenish-black polymer (c) is quite simple and shows a broad $SO_2N$ absorption at 1180 cm.$^{-1}$, indicating that substantial ring closure has occurred.

EXAMPLE III

Polymerization of m-bisaccharin with benzidine in triethylamine m-Bisaccharin (1.45 g., 0.005 mole), recrystallized benzidine (0.926 g., 0.005 mole), triethylamine (0.792 g., 0.008 mole) and water (2.28 g., 0.13 mole) are placed in a polymerization tube. The polymerization is performed according to the procedure of Example II(b). There is placed in a trap 100 ml. of 0.0943 N sulfuric acid. The polymerization tube is flushed with nitrogen and the yellowish-orange reaction mixture is heated at 150° C. for two hours and then at 170° C. for one hour. During heating, the water is distilled slowly. The resulting orange-brown residue changes to reddish-brown and then to dark brown, accompanied by some foaming. There is obtained 2.44 g. (102%) of a glassy reddish-brown solid. From titration of the excess acid in the trap with standard sodium hydroxide (0.1198 N), it is found that the polymer mass contains about 17% (0.0014 mole) of the triethylamine employed. The glassy purple-brown solid is insoluble in water, but somewhat soluble in dimethylacetamide. The intrinsic viscosity of the reddish-brown solid is found to be 0.155 dl./g. in dimethylacetamide at 20° C. The infrared spectrum is similar to that of the product of Example II(a).

EXAMPLE IV

Polymerization of m-bisaccharin with 3,3'-diaminobenzidine in triethylamine m-Bisaccharin (2.16 g., 0.0075 mole), 3,3'-diaminobenzidine (1.62 g., 0.0075 mole), triethylamine (1.05 g., 0.0104 mole) and water (4.11 g., 0.228 mole) are placed in a polymerization tube; some heat is evolved on mixing, yielding a yellow-colored mixture. The tube is then flushed with nitrogen, and the yellow mixture refluxed at 100° C. for two hours, after which time it is reddish-brown in color. Since a large amount of solid is still undissolved, an additional 0.44 g. (0.0044 mole) of triethylamine is added. The mixture remains heterogeneous; it is heated at 100° C. for another hour, then at 120° C. for two hours. During the latter heating period, the water is distilled slowly from the mixture. Then the temperature is raised to 140° C. and maintained at this temperature for one and one-half hours. The mixture becomes a homogeneous viscous, yellow-brown mass which is then heated at 150° C. for one hour, at 160° C. for one hour, and then at 170° C. for one hour, changing in color from a yellow-brown to a reddish-brown. The polymer has an intrinsic viscosity of 1.55 dl./g. in concentrated sulfuric acid-dimethylacetamide and of 0.147 dl./g. in concentrated sulfuric acid at 20° C. Differential thermal analysis of the polymer also shows a sharp endotherm at 590° C. but an endotherm at 230° C. is missing. Some foaming is observed. Then heating is continued at 180° C. for three and one-half hours. On cooling, there is obtained a yellowish-orange solid which softens partly at 75° C., melts partly at 155–163° C., and completely at 180–190° C. The yellowish-orange solid is then heated at 190° C. for two and one-half hours, during which time some foaming occurs. The temperature is then raised to 200° C. and maintained there for three hours. There is obtained 3.7 g. (98%) of an orange polymer (a) having an intrinsic viscosity of 1.30 dl./g. in dimethylacetamide at 20° C. The orange polymer (a) melts partly at 210–225° C. and completely, with foaming, at 245–255° C. Its infrared spectrum shows an intense absorption characteristic of an amide carbonyl group at 1640 cm.$^{-1}$, an intense $SO_2N$ absorption at 1170 cm.$^{-1}$, and a C–N absorption at 1270 cm.$^{-1}$. A weak $SO_2NH_2$ absorption at 1340 cm.$^{-1}$ is also present. From the titration of the excess acid in the trap, it is found that 36.2% (0.00543) of triethylamine still remains bound in the polymer. This suggests that the polymer at this stage is mainly in the form of the hemipolymer shown as Formula XXV wherein $n' > n''$. The differential thermal analysis of polymer (a) shows two sharp endotherms at 230° C. and 590° C. There are several broad endotherms between 360–580° C.

EXAMPLE V

Polymerization of m-bianhydride with 3,3'-diaminobenzidine in three percent dimethylacetamide solution at room temperature 3,3'-diaminobenzidine (purified by recrystallization 0.3 g., 0.001404 mole) is dissolved under a slow stream of nitrogen gas in 10 ml. of diethylacetamide in a 100 ml. three-neck, round-bottom flask equipped with a reflux condenser and a thermometer. The contents of the flask are stirred by a magnetic stirrer. m-Bianhydride (0.408 g., 0.001404 mole) is dissolved in 13 ml. dimethylacetamide and added portionwise to the solution of the amine in the flask at room temperature. The color of the reacting solution changes from yellow to greenish-yellow, and then to orange-yellow. The polymer formed does not separate from the solution and the temperature of the solution does not increase appreciably. Stirring is continued for one hour at room temperature and then the solvent dimethylacetamide is distilled off at 15 mm. at 40–50° C. There is obtained a brown-colored, thick, viscous, syrupy liquid. A portion of the sample is taken out and dried overnight under vacuum at 50° C. to remove the last traces of solvent and there is obtained a yellow, powdery solid polymer (I), soluble in dimethylacetamide. Intrinsic viscosity is found to be 0.10 dl./g. in dimethylacetamide and 0.021 dl./g. in concentrated sulfuric acid at 20° C. An infrared spectrum is also recorded using the potassium bromide disc technique.

The rest of the viscous polymer is transferred to a polymerization tube equipped with a side arm and heated at 200° C. for seventeen hours under a slow stream of nitrogen gas. The temperature is maintained by an electronic controller. The color of the polymer turns brown and becomes insoluble in dimethylacetamide. A portion of sample (II) is taken out and an infrared spectrum using the potassium bromide disc method, is recorded. Then the temperature of the block is raised to 300° C. and maintained at that temperature for two hours, the polymer becoming deep brown. A portion of the polymer (III) is taken out and an infrared spectrum is recorded. The intrinsic viscosity for sample (III) is found to be 0.021 dl./g. in concentrated sulfuric acid at 20° C. The temperature of the block is then raised to 400° C. and maintained at that temperature for two hours. The polymer becomes brownish-black and evolution of some neutral gases of obnoxious odor is observed. A portion of the same (IV) is taken out and an infrared spectrum using the potassium bromide disc method is recorded.

The infrared spectrum of the initial condensation product (1) before heating shows distinct absorption bands for $SO_3H$ and $SO_2$—N at 8.1$\mu$ and 8.4$\mu$ respectively, and an intense band at 6.15$\mu$ characteristic of amide carbonyl which disappears almost completely in the final polymer (IV) obtained by heating at 220° C. for seventeen hours plus, 300° C. for two hours plus, and 400° C. for two hours. Also, the final polymer (IV) shows an absorption band for $SO_2$—N at 8.5$\mu$ and a shoulder at 8.1$\mu$ characteristic of $SO_3H$ groups.

From this it is evident that the controlled polymerization of m-bianhydride with 3,3'-diaminobenzidine proceeds through two successive stages, namely (1) a ring opening step to yield a soluble intermediate (A) or hemipolymer, and (2) two consecutive dehydration steps on post-heating the polymer to yield the final insoluble polymer (C), bisbenzimidazo[1',2'-b; 1'',2''-b']benzo[1,2-d, 5,4-d'-diisothiazole-6,6,8,8-tetroxide. For brevity, we shall refer to this latter class of polymers as "Thiazone" polymers which are further described and claimed in the above-mentioned copending application, U.S. Ser. No. 668,251.

The steps in the polymerization of m-bianhydride with 3,3'-diaminobenzidine can be shown as follows:

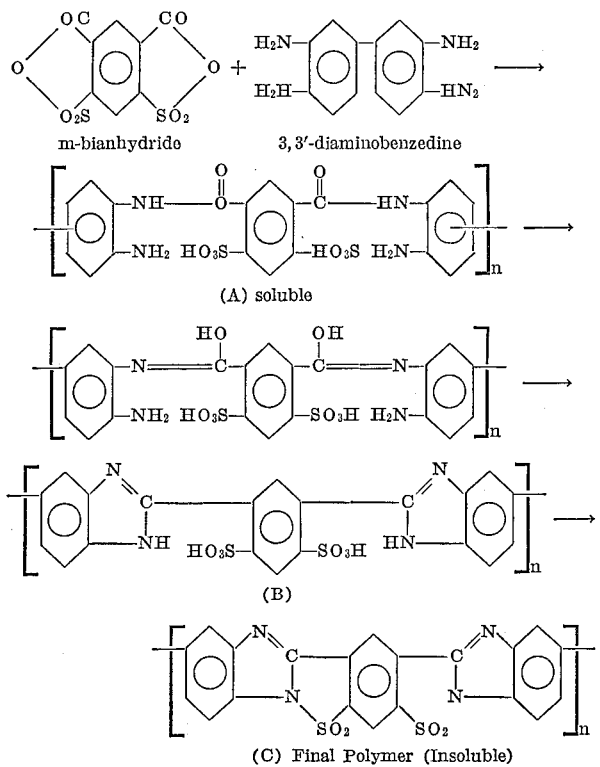

(A) soluble (B)

(C) Final Polymer (Insoluble)

The final polymer (C) can also be represented by:

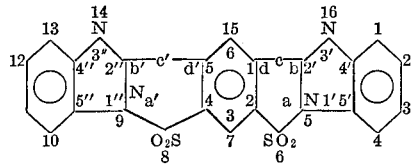

From the infrared spectra it appears that the initial condensation product, that is the soluble hemipolymer (1) is mainly in the form (A), whereas the final insoluble polymer (IV) obtained by postheating polymer (I) to high temperatures may be a mixture of (B) and (C), of which form (C) is predominant.

EXAMPLE VI

Polymerization of m-bianhydride with p-phenylenediamine polyphosphoric acid by slow heating m-Bianhydride (2.9 g., 0.01 mole) and p-phenylenediamine (1.08 g., 0.01 mole) are added, under a slow stream of nitrogen, to polyphosphoric acid (100 g.) in a 250 ml. three-neck, round-botom flask equipped with a mechanical stirrer and a thermometer. On mixing, the temperature of the mixture rises to 35° C. Then the temperature of the mixture is gradually raised to 110–120° C. and maintained at that temperature for six hours; then the temperature is raised to 150° C. and maintained at that temperature for five hours; then to 160–165° C. and maintained at that temperature for twenty-four hours, after which the temperature is finally raised to 170–175° C. and maintained at that temperature for fifty-three hours. The mixture becomes homogeneous after the first six hours of heating and the color of the solution turns yellow. Samples are withdrawn at various periods of time for use in characterization. After heating for a total period of eighty-seven hours, the reaction is discontinued. The polymers are isolated by procedures previously described above, and dried in a vacuum oven at 50° C. for forty hours. The final polymer is orange in color and does not melt up to 300° C., which is the upper limit of the Fisher-Johns melting point apparatus. Since the polymers are found to be insoluble in dimethylacetamide, concentrated sulfuric acid and concentrated sulfuric acid and concentrated sodium hydroxide solution, viscosity determination can not be performed. The infrared spectrum of the polymer is recorded using a KBr disc. The spectrum is simple; it shows a broad absorption at $6.15\mu$ and some absorptions at $8.1\mu$ and $9.5\mu$ which may be due to residual $SO_3H$ groups. The polymer has the structure shown below in Formula XXVI where $n'>n''$.

EXAMPLE VII

Polymerization of m-tetraacid with 3,3'-diaminobenzidine in polyphosphoric acid by slow heating m-Tetraacid (3.98 g., 0.01 mole) and 3,3'-diaminobenzidine (2.14 g., 0.01 mole) are added, under a slow stream of nitrogen gas, to 150 g. of polyphosphoric acid in a 150 ml. three-neck, round-bottom flask equipped with a mechanical stirrer and a thermometer. The temperature of the mixture is slowly raised from room temperature to 150° C. and held there until it becomes homogeneous. Samples are withdrawn at different intervals of time, quenched on crushed ice, the precipitated polymer isolated by decantation and washed thoroughly with large excess of water until the washings are neutral. The solubility characteristics, viscosities and the infrared spectra of the polymers using KBr discs are determined on the polymer samples.

The infrared spectra show distinct absorptions for an amide carbonyl at $6.17\mu$ and for $SO_3H$ at $8.2\mu$ and $9.5\mu$. This indicates that these polymers are mainly in the form shown below in Formula XXVII.

In the preceding Examples II(a), IV, VI, and VII the structures of the respective polymers are represented as follows:

The hemipolymer of Example II(a):

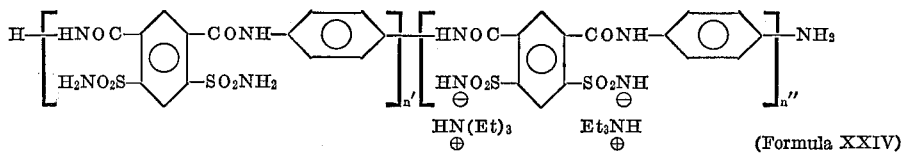

(Formula XXIV)

The hemipolymer of Example IV:

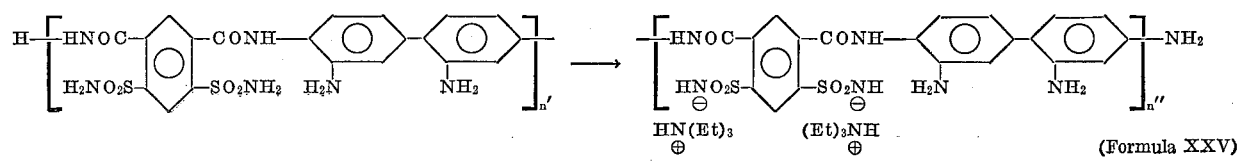

(Formula XXV)

The polymer of Example VI:

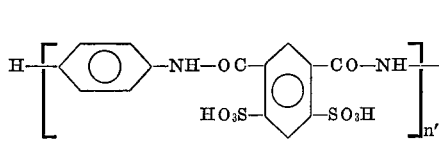

The polymer of Example VII:

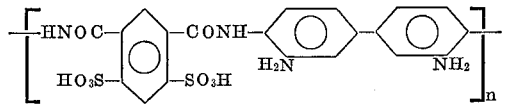

(Formula XXVII)

EXAMPLE VIII

The procedure of Example II(a) is repeated successfully a number of times for the preparation of other polymers of this invention using, in place of the p-phenylenediamine, an equivalent amount in each case of the following polyamines respectively:

(a) m-Phenylenediamine;
(b) Triaminobenzene;
(c) Tetraminobenzene;
(d) Diaminonaphthalene;
(e) Triaminonaphthalene;
(f) Tetraaminonaphthalene;
(g) Diaminodiphenyl;
(h) Triaminodiphenyl;
(i) Tetraaminodiphenyl;
(j) 4,4'-diaminodiphenyloxide;
(k) 4,4'-diaminodiphenylamine;
(l) 4,4'-diaminodiphenylsulfoxide;
(m) 4,4'-diaminodiphenylketone;
(n) 4,4'-dilaminodiphenylsulfone;
(o) 4,4'-diaminodiphenylsulfoxide; and
(p) 4,4'-diaminodiphenylmethane.

EXAMPLE IX

The procedure of Example II(a) is repeated a number of times for the preparation of polymers using individually in place of the bisaccharin an equivalent weight of the following respectively:

(a) Diethyl-4,6-disulfamidoisophthalate;
(b) The dicyclimide of naphthalene-1,5-dicarboxyl-2,6-disulfonic acid;
(c) The dicyclimide of naphthalene-1,6-dicarboxyl-3,7-disulfonic acid;
(d) The dicyclimide of diphenyl-4,4'-dicarboxyl-3,3-disulfonic acid;
(e) Diphenylmethane - 4,4' - dicarboxyl-3,3'-disulfonic acid;
(f) Diphenylsulfide - 3,3' - dicarboxyl - 4,4' - disulfonic acid;
(g) Diphenylsulfone-4,4' - dicarboxyl - 3,3' - disulfonic acid;
(h) Diphenylsulfoxide - 4,4' - dicarboxyl - 3,3' - disulfonic acid; and
(i) Diphenylamine - 3,3' - dicarboxyl - 4,4' - disulfonic acid.

EXAMPLE X

The procedure of Example VII is reepated to produce polymers of this invention using p-phenylenediamine in place of the diaminobenzidine and using individually in place of the tetraacid an equivalent amount in each of the following respectively:

(a) Benzene - 1 - carboxyl - 2,4,5 - trisulfonic acid;
(b) Naphthalene - 1 - carboxyl - 3,5,6 - trisulfonic acid;
(c) Benzene - 1,2,4,5 - tetrasulfonic acid;
(d) Naphthalene - 1,4,5,8 - tetrasulfonic acid; and
(e) Diphenyl-3,3',4,4'-tetrasulfonic acid.

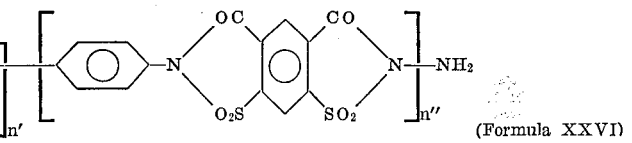

(Formula XXVI)

EXAMPLE XI

The procedure of Example VI is repeated successfully a number of times using individually in place of the p-phenylenediamine, an equivalent amount in each case of the following respectively:

(a) Triminobenzene;
(b) Diaminonaphthalene;
(c) Diaminodiphenyl;
(d) Diaminodiphenyloxide;
(e) Diaminodiphenylamine;
(f) Diaminodiphenylsulfide; and
(g) Diaminodiphenylmethane.

The various monomers described above as suitable for use in preparing polymers of this invention can be used in mixtures of two or more and likewise the polyamides can be used in mixtures of two or more to give polymers having a plurality of repeating units of the type defined herein.

EXAMPLE XII

Polymerization of 3,3',4,4'-diphenyltetrasulfonic acid with p-phenylenediamine in polyphosphoric acid The tetrasulfonic acid (4.01 g., 0.0085 mole), p-phenylenediamine (0.919 g., 0.0085 mole), and polyphosphoric acid (150 g.) are placed in a 250 ml. three-neck flask. The mixture is degassed and a nitrogen atmosphere established. The temperature of the mixture is slowly raised to 150° C. within a period of three hours. During this time the color of the reaction mixture changes from orange-yellow to reddish-brown, finally turning brown and becoming homogeneous. Shortly after the reaction mixture becomes homogeneous, a small amount of white precipitate forms. After heating for three and one-half hours at 150° C., at 160–165° C. for one hour and at 165–175° C. for nineteen hours, a sample is withdrawn and quenched in ice, forming a purple precipitate which is removed by filtration and washed with cold water until the washings are neutral. The purple solid is insoluble in water and in dimethylacetamide but soluble in water and in dimethylacetamide but soluble in concentrated sulfuric acid. Its intrinsic viscosity is found to be 0.074 dl./g. (initial concentration: 0.37% in concentrated sulfuric acid) in concentrated sulfuric acid at 20° C.

The temperature of the reaction mixture is then raised to 180° C. and continued at this temperature for six hours. The polymer is isolated by quenching the reaction mixture on ice and drying the product. There is obtained a purple-black solid having an intrinsic viscosity of 0.081 dl./g. in concentrated sulfuric acid at 20° C. (initial concentration: 0.2% in concentrated sulfuric acid). The purple-black polymer is insoluble in water and in dimethylacetamide, but swelled and then dissolved in concentrated sulfuric acid.

A portion of the polymer postheated at 350° C. for one hour shows no weight loss up to 320° C., at 16% weight loss at 500° C., a 24% weight loss at 800° C. and a 33% weight loss at 1000° C. in nitrogen by thermogravimetric analysis.

Another portion of the polymer postheated at 400° C. for one hour shows a 1% weight loss up to 400° C., a 12% weight loss at 600° C., an 18 weight loss at 800° C., and a 26% weight loss at 1000° C in nitrogen by thermogravimetric analysis.

Still another portion of the polymer postheated at 420° C. for three hours shows a 1% weight loss up to 400° C., a 7% weight loss at 600° C., a 15% weight loss at 800° C. and a 25% weight loss at 1000° C in nitrogen by thermogravimetric analysis.

All of the postheated polymers were insoluble in concentrated sulfuric acid.

While certain features of this invention have been described in detail with respect to various embodiments thereof, it will, of course, be apparent that other modifications can be made within the spirit and scope of this invention and it is not intended to limit the invention to the exact details shown above except insofar as they are defined in the following claims.

I claim:
1. A polymer capable of withstanding temperatures of from 500° to 1000° C. consisting essentially of repeating units therein having the structure:

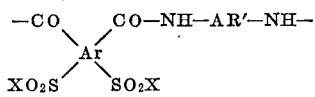

wherein Ar represents a tetravalent, carbocyclic aromatic radical having the valencies to which said $SO_2$ and CO radicals are paired in positions ortho or peri to each other on the aromatic nucleus:

Ar' is a divalent carbocyclic aromatic radical;
X represents a radical selected from the class consisting of —OR, —NHR, —Cl, and —Br; and
R is a radical selected from the class consisting of hydrogen and hydrocarbon of no more than 10 carbon atoms.

2. The polymer of claim 1 in which said repeating units consist essentially of the repeating unit having the formula

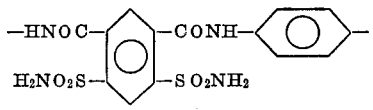

3. The polymer of claim 1 in which said repeating units consist essentially of the repeating unit having the formula

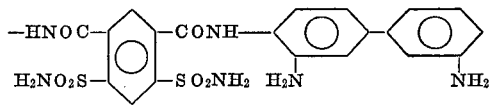

4. The polymer of claim 1 in which said tetrafunctional monomer is the dianhydride of benzene-1,3-dicarboxyl-4,6-disulfonic acid.

5. A polymer capable of withstanding temperatures of from 500 to 1000° C. consisting essentially of a mixture of repeating units therein having the following structures:

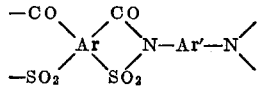

and

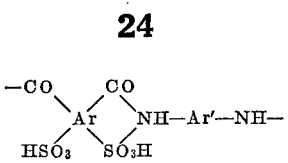

wherein Ar represents a tetravalent, carbocyclic aromatic radical having the valencies to which said $SO_2$ and CO radicals are paired in positions ortho or peri to each other on the aromatic nucleus; and $Ar_2$ is a divalent carbocyclic aromatic radical.

6. The process of preparing a polymer capable of withstanding temperatures of from 500° to 1000° C. comprising the step of heating to a temperature above the melting point a mixture of approximately stoichiometric proportions of a tetrafunctional monomer and an aromatic polyamine having the formulas respectively:

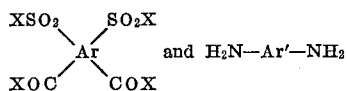

wherein
Ar represents a tetravalent carbocyclic aromatic nucleus;
Ar' represents a divalent carbocyclic aromatic nucleus;
X represents a radical selected from the class consisting of —OR, —NHR, —Cl, and —Br; and
R is a radical selected from the class consisting of hydrogen and hydrocarbon of no more than 10 carbon atoms.

7. The process of claim 6 in which said tetrafunctional monomer is the dicyclimide of benzene-1,3-dicarboxyl-4,6-disulfonic acid.

8. The process of claim 6 in which said tetrafunctional monomer is the dicyclicimide of naphthalene-2,6-dicarboxyl-4,6-disulfonic acid.

9. The process of claim 6 in which said heating step is effected while said compound is in intimate contact with dimethylacetamide.

References Cited
UNITED STATES PATENTS

| | | | |
|---|---|---|---|
| 2,621,168 | 12/1952 | Ross et al. | 260—78 |
| 3,110,701 | 11/1963 | Wear | 260—78 |
| 3,296,204 | 1/1967 | Caldwell | 260—78 |

HAROLD D. ANDERSON, Primary Examiner

U.S. Cl. X.R.

117—161; 260—32.6, 47, 49, 65, 79, 79.3, 301, 327, 470, 505, 507, 515